United States Patent [19]

Miyahara

[11] Patent Number: 5,055,759
[45] Date of Patent: Oct. 8, 1991

[54] SERVO ACCELEROMETER
[75] Inventor: Norio Miyahara, Saitama, Japan
[73] Assignee: Jeco Co., Ltd., Gyoda, Japan
[21] Appl. No.: 565,230
[22] Filed: Aug. 9, 1990

[30] Foreign Application Priority Data

Aug. 10, 1989 [JP] Japan .................................. 1-205609

[51] Int. Cl.⁵ ............................................. G01P 15/08
[52] U.S. Cl. .................................... 318/651; 318/490;
73/517 R
[58] Field of Search ............... 318/560, 638, 640, 646,
318/648, 651, 652, 490; 73/1 B, 488, 514, 517
R, 518, 519, 497

[56] References Cited

U.S. PATENT DOCUMENTS

| 3,789,674 | 2/1974 | Anderson et al. | 73/517 R |
| 3,798,454 | 3/1974 | Weiss | 73/517 R X |
| 4,239,963 | 12/1980 | August et al. | 73/517 R X |
| 4,779,463 | 10/1988 | Woodruff | 73/517 R |
| 4,930,862 | 6/1990 | Miers et al. | 350/96.29 |

*Primary Examiner*—Bentsu Ro
*Attorney, Agent, or Firm*—Blakely, Sokoloff, Taylor & Zafman

[57] ABSTRACT

A servo accelerometer includes a pendulum, a coil, a detection unit, and a servo unit. The detection unit has a photopotentiometer for receiving light passing through a slit of the pendulum and outputting a detection output on the basis of a change in resistance corresponding to a change in irradiation point. The servo unit has a displacement detection circuit for outputting a difference between a detection output from the photopotentiometer and a set value as a detection displacement amount.

5 Claims, 4 Drawing Sheets

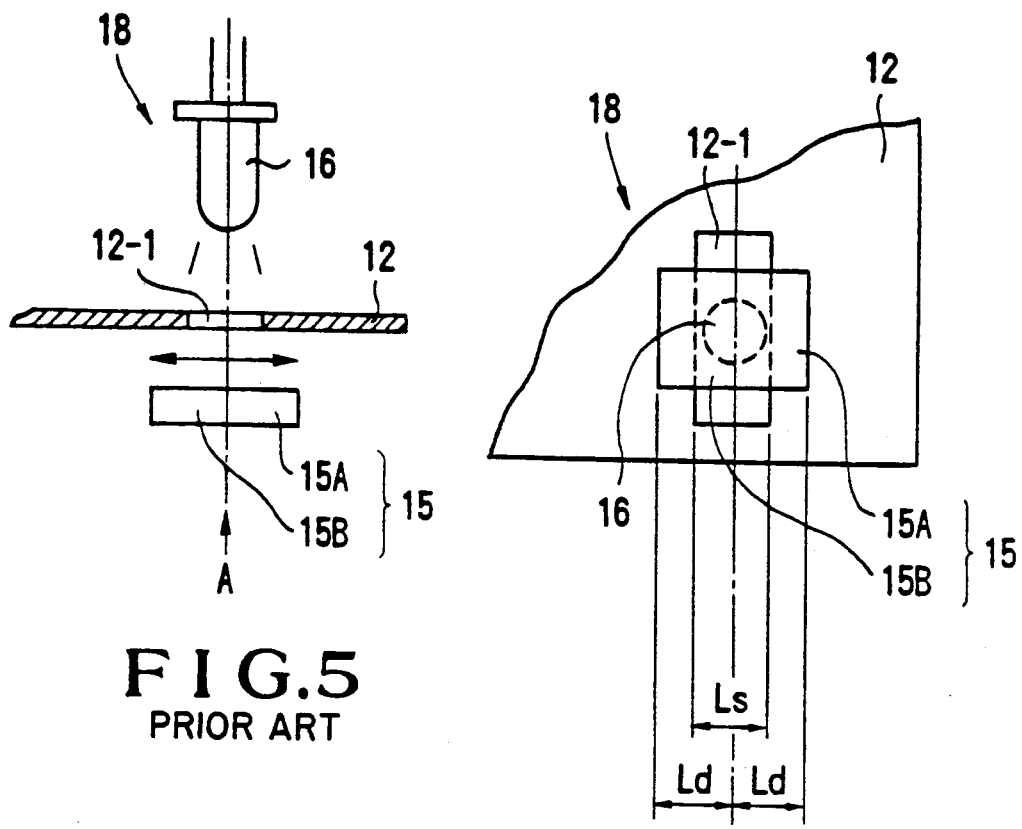
F I G. 5
PRIOR ART
F I G. 6
PRIOR ART
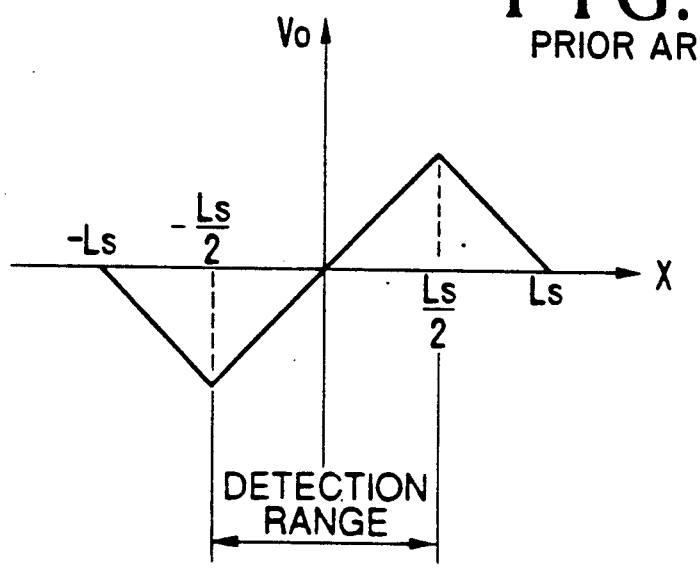
F I G. 7
PRIOR ART

SERVO ACCELEROMETER

BACKGROUND OF THE INVENTION

The present invention relates to a servo accelerometer having a servo circuit for detecting a displacement amount of a pendulum and for generating a force balanced with a force applied to the pendulum by supplying a current corresponding to the detected displacement amount to a coil mounted on the pendulum.

An operation principle of a servo circuit of this type will be described with reference to a block diagram shown in FIG. 3.

In FIG. 3, reference numeral 1 denotes a mass; 2, a pendulum; 3, a displacement detector; 4, a servo amplifier; 5, a V/I converter; and 6, a torquer coil. A force $F_2$ generated by the torquer coil 6 is adjusted so that $F_2=0$ when an acceleration $\alpha$ input to the servo accelerometer is zero. Since a force acting on the pendulum 2 is represented by a difference between a force $F_1$ caused by the acceleration $\alpha$ acting on the mass m of the pendulum 2 and the force $F_2$ generated by the torquer coil 6, the following equation is established.

$$F = F_1 - F_2 = m\alpha - F_2 \quad (1)$$

The equation of motion of the pendulum 2 is:

$$m\frac{d^2x}{dt^2} = F - D\frac{dx}{dt} - Kx \quad (2)$$

where, D is a damping factor constant, and K is a spring constant of a flexure member.

By Laplace transformation of the above equation (2), a transfer function of the pendulum 2 can be obtained by the following equation.

$$\frac{X(S)}{F(S)} = \frac{1}{mS^2 + DS + K} \quad (3)$$

A displacement amount of the pendulum 2 is converted to a voltage $V_0$ by the displacement detector 3 (conversion constant $A_0$). The voltage $V_0$ is multiplied with $A_1$ to be a voltage $V_1$ by the servo amplifier 4. The voltage $V_1$ is converted to a current i by the V/I converter 5 (conversion constant $A_2$). The current i is supplied to the torquer coil 6, and converted to a force $F_2$ with a conversion constant $A_3$. That is, by a negative feedback satisfying $F_1=F_2$, i.e., generating a force $F_2$ balanced with the force $F_1$, the pendulum 2 is servocontrolled at a predetermined point.

In this case, since the current i is in proportion to the acceleration $\alpha$, an input acceleration can be detected on the basis of the value of current i.

It can be proved that the current i is in proportion to the acceleration $\alpha$ as follows. That is, referring to FIG. 3, a transfer function G between the acceleration $\alpha$ and the current i can be represented as follows.

$$G = \frac{mA_0A_1A_2}{mS^2 + DS + K + A_0A_1A_2A_3} \quad (4)$$

If $t = \infty$, then $S=0$, and the following equation can be satisfied.

$$\lim_{t=\infty} G = \frac{mA_0A_1A_2}{K + A_0A_1A_2A_3} = G_0 \quad (5)$$

Equation (5) can be rewritten as follows when it is assumed that $K=0$.

$$G_0 = \frac{m}{A_3} \quad (6)$$

Since m and $A_3$ are constants, the current i is in proportion to the acceleration $\alpha$.

A mechanical structure of the servo accelerometer on the basis of the above principle is shown in FIG. 4.

In FIG. 4, a pendulum 12 is swingably supported by a flexure member 11 in a direction of the input acceleration. Coils 14-1 and 14-2 are mounted on both the sides of the pendulum 12. Magnets 13-1 and 13-2 are arranged at both the sides of the pendulum 12 opposing to each other. That is, a torquer coil 17 is constituted by the magnets 13-1 and 13-2, and the coils 14-1 and 14-2. Since the coils 14-1 and 14-2 move in a magnetic field generated by the magnets 13-1 and 13-2 with the pendulum 12, by supplying a proper current i corresponding to a displacement amount x of the pendulum 12 to the coils 14-1 and 14-2, a force can be balanced with the input acceleration $\alpha$.

A slit plate 12-2 is secured on the lower end of the pendulum 12, and a slit 12-1 is formed in the slit plate 12-2. A displacement detection mechanism 18 is constituted by the slit 12-1, a two-split photodiode 15, and an LED 16. The position of the pendulum 12 is detected by the displacement detection mechanism 18. FIGS. 5 and 6 show a main part of the displacement detection mechanism 18. More specifically, at a zero point of the displacement detection mechanism 18, light of the LED 16 passing through the slit 12-1 is equally incident on photodiodes 15A and 15B. From this state, when the slit 12-1 moves in the direction of the arrow in FIG. 5, a difference appears between the incident light amounts of the photodiodes 15A and 15B. That is, the difference between the incident light amounts of the photodiodes 15A and 15B represents a displacement amount x and a displacement direction of the pendulum 12. When it is assumed that the difference of the incident light amounts can be obtained as an output voltage $V_0$, ideal characteristics between displacement amounts and output voltages can be obtained as shown in FIG. 7. Considering the relationship of dimensions between the slit 12-1 and the photodiodes 15A and 15B, under the condition wherein Ls (a width of the slit 12-1)=Ld (a width of light-receiving planes of the photodiodes 15A and 15B), the largest detection range and the highest output voltage $V_0$ can be obtained.

Note that, as a detection method of the displacement amount x of the pendulum 12, a method by a differential transformer, or a method using a change in capacitance can be used, as well as the method using the two-split photodiode described above. The methods by a differential transformer, or by change in capacitance are, however, methods of detecting a displacement amount by impedance measurement. As a result, an oscillator is required, so that it is disadvantageous to make a unit compact or reduce cost of the unit. That is, by the method using the two-split photodiode, a gain between the displacement amount x and the output voltage $V_0$ is large, thus obtaining both economical and operational advantages.

FIG. 8 shows an electrical circuit arranged using the mechanical structure shown in FIG. 4. The LED 16 is connected to a power supply through a resistor $R_1$ for setting a light amount of the LED 16. The photodiodes 15A and 15B are differentially connected to an operational (OP) amplifier 21-3 through high-input OP amplifiers 21-1 and 21-2, and a differential output is amplified by the OP amplifier 21-3. That is, an amplified output from the OP amplifier 21-3 is an output voltage $V_0$, and it becomes a voltage $V_1$ through a phase compensation circuit 22 inserted for improving response characteristics, and a servo amplifier 23. The voltage $V_1$ is applied to the coils 14-1 and 14-2 of the torquer coil 17. Therefore, a current i is supplied to the coils 14-1 and 14-2, a force $F_2$ for causing the displaced slit 12-1 to return to the zero point is generated by the torquer coil 17, and the force $F_2$ balances with a force applied to the pendulum 12 by the acceleration. The current i at this time is detected by a current detection circuit 24 and appears as an output from an OP amplifier 24-1, and the input acceleration can be detected on the basis of the output from the OP amplifier 24-1.

According to the conventional servo accelerometer, as is obvious from equations (5) and (6), since accuracy is decided by a ratio of K to $A_0A_1A_2A_3$, it is required to make the flexure member 11 thin so as to cause a spring constant K to be extremely small, and to have only one shaft having a degree of freedom to increase the accuracy. Therefore, the manufacture and assembly become difficult, and it is necessary to carefully handle the products.

In addition, in FIG. 7, a detection range used by the servo system is from Ls/2 to -Ls/2. When the pendulum 12 displaces beyond this range, positive feedback control is performed, and the pendulum 12 is kept swung to one side.

At this time (when the pendulum 12 is kept swung to one side), the pendulum 12 may be distorted beyond an elastic region of the flexure member 11. To prevent this distortion, stoppers (not shown) are arranged at both the sides of the pendulum 12. Since a commercially available two-split photodiode has an Ld dimension of 1 mm, both the stoppers must be adjusted to cause the pendulum 12 to swing within the range of 0.5 mm to −0.5 mm.

On the other hand, the pendulum 12 is designed so that the zero point of the displacement detection mechanism 18 is positioned in the vertical direction of a fulcrum of the pendulum 12 in an assembled state. When the spring constant K is not equal to zero (since the accuracy is set compromised with performance specifications of the products and the cost, K is not equal to 0), the pendulum 12 is not always positioned at the zero point of the displacement detection mechanism 18 because of an initial distortion or a distortion generated during assembly of the flexure member 11. That is:

(1) When the flexure member 11 is distorted, and the pendulum 12 is positioned within the detection range of the displacement detection mechanism 18, since the spring constant K is not equal to zero, an offset is included in the output from the accelerometer by the reaction force generated by the flexure member 11.

(2) When the flexure member 11 is distorted, and the pendulum 12 is positioned beyond the detection range of the displacement detection mechanism 18, as described above, the pendulum 12 is kept swung to one side.

Note that, when an assembly tolerance is large, a mechanism for finely adjusting a position of the two-split photodiode 15 is required. This adjustment can be performed either before a power source is turned on, or using an open feedback loop. In either case, the adjustment must be performed finely, so that it is inevitable to increase cost. In addition, since a position of the two-split photodiode 15 as an important functional part is adjusted, reliability of a servo accelerometer is degraded. Note that, to widen the detection range of the displacement detection mechanism 18, there is no technique except for making a chip size of the two-split photodiode 15 large, resulting in an increase in cost.

Moreover, since an output impedance of a photodiode is generally high, a circuit arrangement as shown in FIG. 8 is required. The high impedance amplifiers 21-1 and 21-2 such as Bi-MOS input OP amplifiers are used, and a signal line leakage must be prevented, resulting in an increase in cost.

Furthermore, although an LED is used as the light source 16 of the displacement detection mechanism 18, an intensity of an LED depends on temperature, and the intensity tends to be degraded. Since an incident light amount of the two-split photodiode 15 is changed with a change in intensity of an LED, a gain of the output voltage of a displacement detection circuit 21 varies, and an open gain of the servo accelerometer is varied. Therefore, a correction circuit for the change in intensity is required.

SUMMARY OF THE INVENTION

It is a principal object of the present invention to provide a servo accelerometer capable of facilitating zero point adjustment of a pendulum as compared to a conventional accelerometer.

It is another object of the present invention to provide a servo accelerometer having a smaller number of parts than a conventional accelerometer so as to simplify assembly and adjustment.

It is still another object of the present invention to provide a servo accelerometer having a high impact resistance.

It is still another object of the present invention to provide a servo accelerometer wherein a pendulum is never kept swung to one side beyond a detection region.

It is still another object of the present invention to provide a servo accelerometer having a larger design margin than a conventional accelerometer.

In order to achieve the above objects of the present invention, there is provided a servo accelerometer comprising a pendulum which is swingably supported and has a slit, a coil mounted on the pendulum, detection means for detecting a displacement amount of the pendulum, and servo means for generating a force balanced with a force applied to the pendulum by supplying a current to the coil on the basis of an output from the detection means, wherein the detection means includes a photopotentiometer for receiving light passing through the slit of the pendulum, and outputting a detection output on the basis a change in resistance corresponding to a change in irradiation point, and the servo means includes a displacement detection circuit for outputting a difference between a detection output from the photopotentiometer and a set value as a detection displacement amount.

According to the present invention, therefore, a position of the pendulum is detected as a change in resistance of the photopotentiometer, a difference between the detection output from the photopotentiometer and the set output variably set is a detection displacement amount, and a current corresponding to the detection displacement amount is supplied to the coil.

BRIEF DESCRIPTION OF THE DRAWINGS

FIG. 5 is a sectional plan view showing a main part of a displacement detection mechanism of the servo accelerometer;

FIG. 6 is a sectional view of the main part in the FIG. 5 along an A direction;

FIG. 7 is a graph showing ideal characteristics between displacement amounts x and output voltages $V_0$ in the servo accelerometer.

DESCRIPTION OF THE PREFERRED EMBODIMENT

A servo accelerometer according to the present invention will be described in detail hereinafter.

Figures 1, 2:
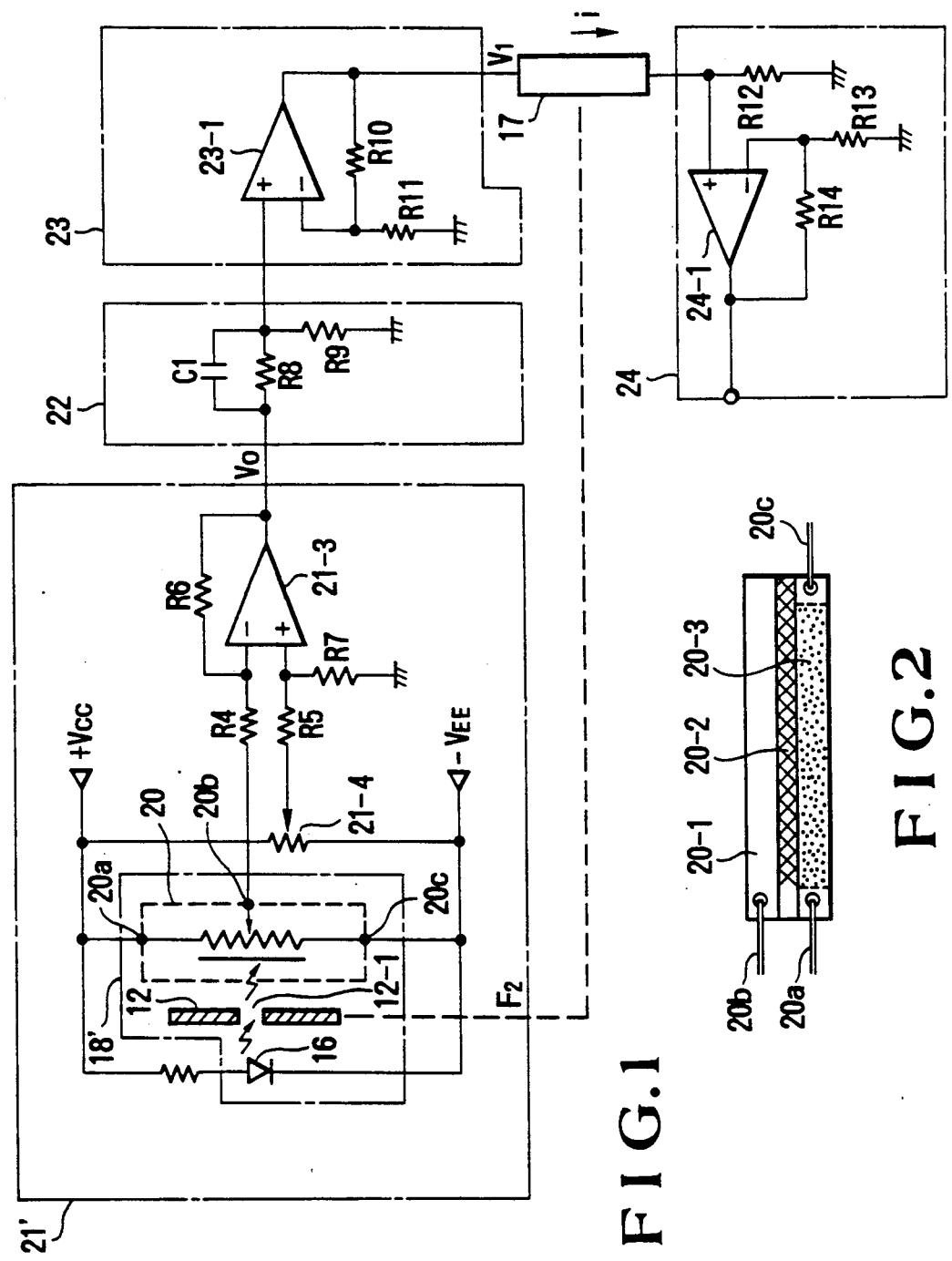
FIG. 1 is a circuit diagram showing an embodiment of a servo accelerometer according to the present invention.
FIG. 2 is a plan view showing a schematic structure of a photopotentiometer used in the servo accelerometer.
Figure 3:
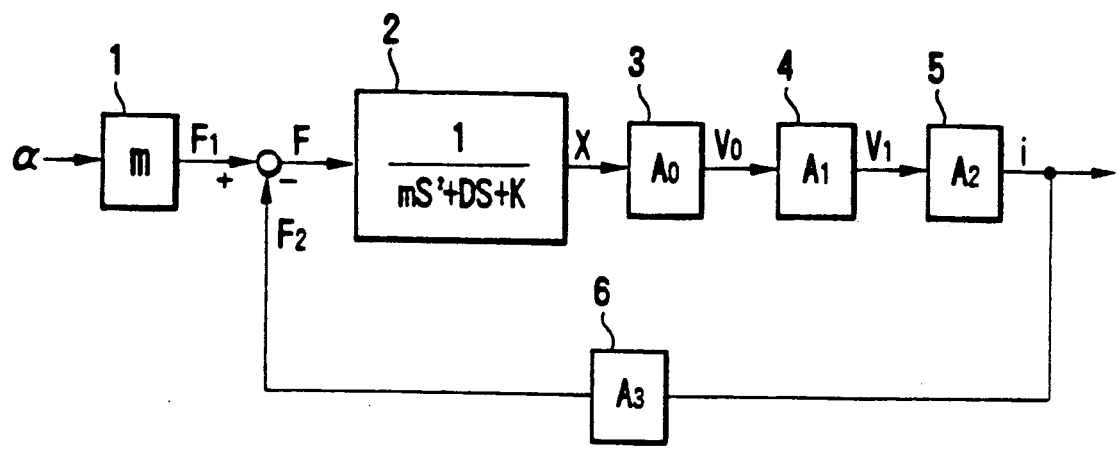
FIG. 3 is a block diagram for explaining an operation principle of the servo accelerometer.
Figure 4:
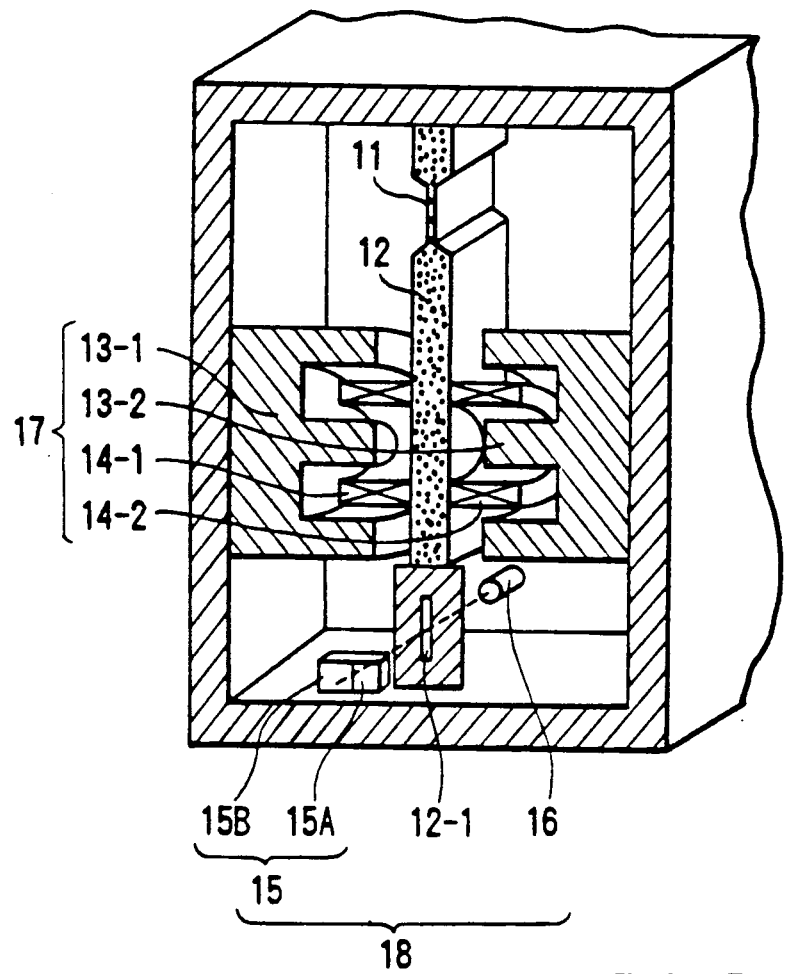
FIG. 4 is a sectional perspective view showing a mechanical st of a conventional servo accelerometer.
Figure 8:
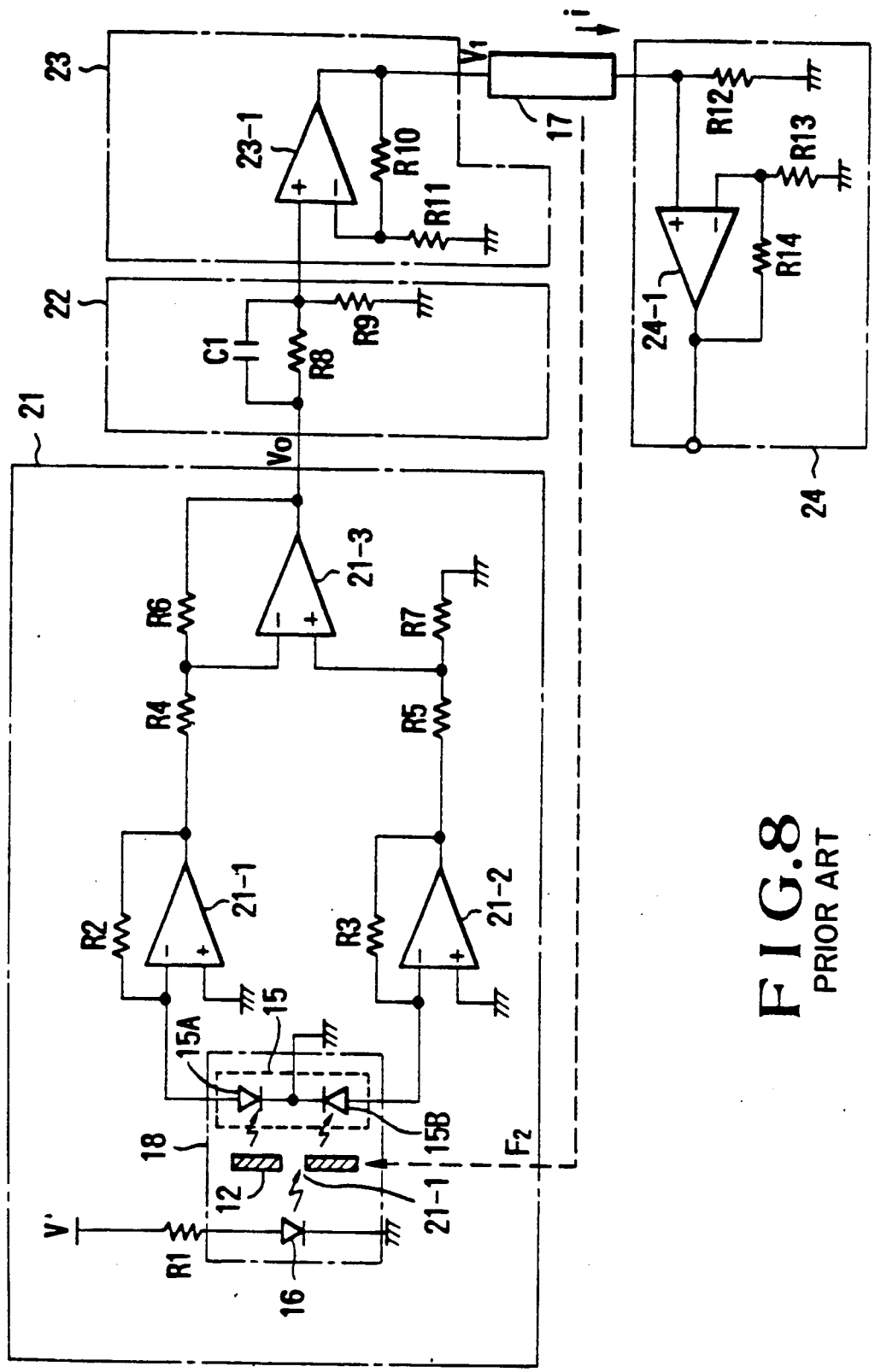
FIG. 8 is a circuit diagram of the servo accelerometer.

FIG. 1 shows an embodiment of the servo accelerometer. In FIG. 1, the same reference numerals as in FIG. 8 denote the same or corresponding parts in FIG. 1, and a detailed description thereof will be omitted. The servo accelerometer is different from the conventional accelerometer in arrangement of a displacement detection circuit 21'. More specifically, in the conventional servo accelerometer, the two-split photodiode 15 is used in the displacement detection mechanism 18. In the servo accelerometer of this embodiment, however, a photopotentiometer 20 is used. FIG. 2 shows a schematic arrangement of the photopotentiometer 20. As shown in FIG. 2, a conductor 20-1, a photoconductor (CdS, CdSe) 20-2, and a metal film resistor 20-3 are printed on a ceramic substrate (not shown). The photoconductor 20-2 has a high resistance in a dark place, and a low resistance in a bright place. As a result, when light passing through a slit 12-1 is radiated on the photoconductor 20-2, a resistance of an irradiated part is locally decreased to short-circuit the conductor 20-1 and the metal film resistor 20-3, and a resistance corresponding to a irradiated position of the passing light, i.e., a voltage value is obtained. The voltage is output from an electrode 20b connected to the conductor 20-1. That is, the voltage applied to the metal film resistor 20-3 through electrodes 20a and 20c is divided by mechanical dimensions of the irradiated position of the photoconductor 20-2, and a divided voltage is output from the electrode 20b. The voltage output from the electrode 20b is supplied to an inverting input terminal of an OP amplifier 21-3. On the other hand, a voltage adjusted by an offset adjusting potentiometer 21-4 is applied to a non-inverting input terminal of the OP amplifier 21-3 as a set voltage.

In the servo accelerometer arranged as described above, when the servo accelerometer is horizontally located after assembly, and is turned on in a state wherein the offset adjusting potentiometer 21-4 is set at the reference position near the middle point, a pendulum 12 is servo-controlled at a point wherein the set voltage adjusted by the offset adjusting potentiometer 21-4 coincides with an output voltage from the photopotentiometer 20 (a voltage output from the electrode 20b) and stops. At this time, a torquer coil 17 generates a force to cancel a shift of the pendulum 12 from a zero point of a displacement detection mechanism 18'. Therefore, if the set voltage adjusted by the offset adjusting potentiometer 21-4 is adjusted so that a current supplied to the torquer coil 17 is zero, a mechanical zero point of the pendulum 12 is determined. Thus, a difference between the output voltage from the photopotentiometer 20 and the set voltage adjusted by the offset adjusting potentiometer 21-4 is a detection displacement amount of the pendulum 12, and an output voltage $V_0$ corresponding to the detection displacement amount is output from the displacement detection circuit 21, That is, by the servo accelerometer according to the embodiment, even if (1) the spring constant K of the flexure member 11 is not zero, (2) the flexure member 11 has a distortion, and (3) the pendulum 12 has an offset from the vertical direction in an assembled state, (a) mechanical zero point adjustment of the pendulum can be electrically performed, (b) an adjusting process is simplified, and (c) a position adjusting mechanism of the displacement detection mechanism 18' is not required, so that the reliability is improved.

In addition, since the spring constant K is allowed to be a limited value except zero within a range of performance specifications of a product, (d) a mechanical strength of the flexure member 11 can be increased, so that an impact resistance can be increased, (e) handling of the flexure member 11 in manufacture and assembly becomes easy, and (f) cost of the flexure member 11 can be reduced.

Moreover, since the displacement of the pendulum 12 can be linearly detected in a wide range by the photopotentiometer 20, (g) the pendulum 12 is never kept swung to one side beyond the detection range, (h) it is only required to arrange the stopper within the elastic region of the flexure member 11, (i) it is not necessary to adjust the stopper, and (j) the servo accelerometer can be turned on immediately after the assembly, and the adjusting process is simplified.

Furthermore, since the circuit arrangement of the displacement detection circuit 21' is simplified, (k) cost can be further reduced, and (l) reliability can be improved.

Furthermore, since an output impedance of the photopotentiometer 20 is relatively low, (m) a general-purpose bipolar OP amplifier can be used.

Furthermore, as can be obvious from the operation principle of the photopotentiometer 20, a gain of the displacement detection circuit 21' is independent of a change in intensity of an LED 16, so that the open gain of the servo accelerometer is free from a change in intensity of the LED 16. Therefore, (n) the open gain is stabilized, and a sufficient design margin is assured, and (o) an intensity change compensation circuit is not required.

As can be obvious from the above description, according to the servo accelerometer of the present invention, a position of the pendulum is detected as a change in resistance of the photopotentiometer, a difference between the detection output from the photopotentiometer and the set output variably set is a detection displacement amount, and a current corresponding to the displacement amount is supplied to the coils. Therefore, the present invention has an effect which can solve the problems of the conventional servo accelerometer at once to provide an effect wherein the mechanical zero point of the pendulum can be electrically determined by adjustment of the set voltage.

What is claimed is:

1. A servo accelerometer comprising:

a pendulum which is swingably supported and has a slit;

a coil mounted on said pendulum;

detection means for detecting a displacement amount of said pendulum; and servo means for generating a force balanced with a force applied to said pendulum by supplying a current to said coil on the basis of a detection output from said detection means, wherein said detection means includes a photopotentiometer for receiving light passing through said slit of said pendulum, and outputting said detection output on the basis of a change in resistance corresponding to a change of light in irradiation position on said potentiometer; and said servo means includes a displacement detection circuit for outputting a difference between said detection output from said photopotentiometer and a set value as a detection displacement amount.

2. A servo accelerometer according to claim 1, wherein said displacement detection circuit is arranged to detect the shift of said irradiated position of light passing through said slit of said pendulum on said photopotentiometer upon a change in position of said pendulum, so that the detection output is changed.

3. A servo accelerometer according to claim 2, wherein said displacement detection circuit further includes an operational amplifier with two input terminals, one of which receives the detection output from said photopotentiometer, and the other of which is connected to an offset adjusting means.

4. A servo accelerometer according to claim 3, wherein said offset adjusting means is constituted by an offset adjusting potentiometer for outputting an output from a movable terminal.

5. A servo accelerometer according to claim 2, wherein said photopotentiometer is constituted by a conductor, a resistor, and a photoconductor arranged between said conductor and said resistor.

* * * * *

UNITED STATES PATENT AND TRADEMARK OFFICE
CERTIFICATE OF CORRECTION

PATENT NO. : 5,055,759
DATED : October 8, 1991
INVENTOR(S) : Miyahara

It is certified that error appears in the above-identified patent and that said Letters Patent is hereby corrected as shown below:

In [57] ABSTRACT, 1st line change "A servo" to --The servo--;

In column 2 at line 6 after "when it is" delete "L";

In column 5 at line 19 change "mechanical st" to --mechanical structure--;

In column 6 at line 23 change "21" to --21'--.

Signed and Sealed this

Twenty-fourth Day of October, 1995

Attest:

BRUCE LEHMAN

*Attesting Officer*      *Commissioner of Patents and Trademarks*